(12) United States Patent
Chang

(10) Patent No.: US 10,384,440 B2
(45) Date of Patent: Aug. 20, 2019

(54) ADJUSTING DEVICE AND ADJUSTING METHOD THEREOF

(71) Applicant: TECO IMAGE SYSTEMS CO., LTD., Taipei (TW)

(72) Inventor: Kuei-Chung Chang, Taipei (TW)

(73) Assignee: TECO IMAGE SYSTEMS CO., LTD., Taipei (TW)

(*) Notice: Subject to any disclaimer, the term of this patent is extended or adjusted under 35 U.S.C. 154(b) by 419 days.

(21) Appl. No.: 15/386,524

(22) Filed: Dec. 21, 2016

(65) Prior Publication Data

US 2018/0162067 A1    Jun. 14, 2018

(30) Foreign Application Priority Data

Dec. 9, 2016  (TW) ............................. 105140806 A

(51) Int. Cl.
| | | |
|---|---|---|
| B29C 67/00 | (2017.01) | |
| B33Y 10/00 | (2015.01) | |
| B33Y 30/00 | (2015.01) | |
| B33Y 50/02 | (2015.01) | |
| B29C 64/112 | (2017.01) | |
| B29C 64/386 | (2017.01) | |
| B29C 64/40 | (2017.01) | |

(52) U.S. Cl.
CPC ............ *B33Y 50/02* (2014.12); *B29C 64/112* (2017.08); *B29C 64/386* (2017.08); *B29C 64/40* (2017.08); *B33Y 10/00* (2014.12); *B33Y 30/00* (2014.12)

(58) Field of Classification Search
CPC ... B29C 64/227; B29C 64/245; B29C 64/232; B29C 64/386; B29C 64/20; B29C 64/106; B33Y 30/00
See application file for complete search history.

(56) References Cited

U.S. PATENT DOCUMENTS

2016/0052207 A1*  2/2016  Bloom ................... B33Y 30/00
                                                              425/3

FOREIGN PATENT DOCUMENTS

| CN | 104057612 A | 9/2014 |
|---|---|---|
| TW | M482474 U | 7/2014 |
| TW | I555647 B | 11/2016 |

* cited by examiner

*Primary Examiner* — Joseph S Del Sole
*Assistant Examiner* — Mohamed K Ahmed Ali
(74) *Attorney, Agent, or Firm* — Kirton McConkie; Evan R. Witt

(57) ABSTRACT

A three dimensional printer includes a spray head, a transmission mechanism, a construction platform, an adjustment device of the construction platform, a plurality of oil cylinders, an oil tank and a sensor. The spray head is disposed opposite to the construction platform, and the transmission mechanism is connected to the spray head for driving the spray head to move at a horizontal displacement plane. The oil cylinders are disposed at the construction platform for adjusting the construction platform to be parallel to the horizontal displacement plane. Hydraulic oil is stored in the oil tank, and each oil cylinder is connected with the oil tank through an oil pipe. The sensor is disposed at the spray head for sensing a plurality of vertical distances between the spray head and the oil cylinders. Therefore, the adjustment process and mechanism are simplified, and the advantages of enhancing the precision of the adjustment are achieved.

6 Claims, 5 Drawing Sheets

ADJUSTING DEVICE AND ADJUSTING METHOD THEREOF

CROSS-REFERENCE TO RELATED APPLICATION

This application claims priority from Taiwan Patent Application No. TW 105140806, filed on Dec. 9, 2016, the entire contents of which are incorporated herein by reference for all purposes.

FIELD OF THE INVENTION

The present invention relates to A three dimensional printer, and more particularly to an adjustment device and an adjusting method thereof, which perform an adjustment to a construction platform of the three dimensional printer through oil cylinders.

BACKGROUND OF THE INVENTION

In recent years, with the progress of the industrial technology, the cost of the three dimensional printing is reduced substantially, such that the three dimensional printers become more and more common. Generally, the three dimensional printing is implemented by a printing spray head that printing layer by layer on a construction platform. The construction platform and the printing spray head have to be kept in an equal interval, and have to be parallel to each other at a horizontal displacement direction.

Practically, the construction platforms may lose the parallel relationship with the printing spray heads because the machines are moved or the tables are not level, such that while printing and modeling, the materials cannot attach to the construction platforms successfully, or the printing spray heads may touch the construction platforms and cause the products of printing fail to model. Therefore, the parallel relationship between the construction platforms and the printing spray heads are usually rebuild through the construction platform adjustment mechanisms.

In currently used construction platform adjustment mechanisms, the construction platforms are adjusted through disposing screws. For example, the screws are adjusted manually by the operators, or through the motors and the gear groups. However, the process of the manual adjustment is complicated and time consuming, and the results of the adjustment are not accurate. In addition, in the motors and gear groups adjustment mechanisms, the operations are complicated, the volumes of the elements are large such that much space is occupied, and the cost is high relatively.

Therefore, there is a need of providing an adjustment device and an adjusting method thereof of a construction platform of a three dimensional printer to solve the drawbacks in prior arts, reduce the time of adjusting, simplify the adjusting process and mechanism, reduce the occupied space, and achieve the advantages of enhancing the precision of the adjustment.

SUMMARY OF THE INVENTION

It is an object of the present invention to provide an adjustment device and an adjusting method thereof in order to solve the drawbacks of prior art.

The present invention provides an adjustment device and an adjusting method thereof. By disposing the oil cylinders of simple structures and smaller volumes to adjust the construction platform of the three dimensional printer, the adjustment process and mechanism are simplified, and the space occupied by the adjustment device is reduced.

The present invention also provides an adjustment device and an adjusting method thereof. Through opening and closing the solenoid valves, the oil tank is controlled to pressurize the oil cylinders. The control circuit is easier, and the cost is lower. In addition, when the solenoid valves are closed, the oil cylinders can still maintain adjusted condition because of the incompressibility of the hydraulic oil, such that the stability of the construction platform is enhanced.

The present invention further provides an adjustment device and an adjusting method thereof. Since the strokes of the oil cylinders are constant values, and the oil cylinders can be reset to the lowest initial positions through the springs, the adjustment range of the oil cylinders is limited for preventing collision occurred while the construction platform is adjusted.

The present invention further provides an adjustment device and an adjusting method thereof. Through adjusting the areas of the pistons of the oil cylinders, the diameters of the oil pipes and the viscosity coefficient of the hydraulic oil, the velocity and precision of adjusting the oil cylinders are controlled, and the advantages of enhancing the precision and accuracy of the adjustment of the construction platform are achieved.

In accordance with an aspect of the present invention, there is provided an adjustment device of a construction platform of a three dimensional printer. The adjustment device comprises a spray head, a transmission mechanism, a plurality of oil cylinders, an oil tank and a sensor. The spray head is disposed opposite to the construction platform, and the transmission mechanism is connected to the spray head for driving the spray head to move at a horizontal displacement plane. The oil cylinders are disposed at the construction platform for adjusting the construction platform to be parallel to the horizontal displacement plane. Hydraulic oil is stored in the oil tank, and each oil cylinder is connected with the oil tank through an oil pipe. The sensor is disposed at the spray head for sensing a plurality of vertical distances between the spray head and the oil cylinders during the movement of the spray head at the horizontal displacement plane.

In accordance with an aspect of the present invention, there is provided an adjusting method. The adjusting method comprises steps of: (a) providing a construction platform, a spray head, a transmission mechanism, a plurality of oil cylinders, an oil tank and a sensor, wherein the spray head is disposed opposite to the construction platform, the transmission mechanism is connected to the spray head, the oil cylinders are disposed at the construction platform, hydraulic oil is stored in the oil tank, each oil cylinder is connected with the oil tank through an oil pipe, and the sensor is disposed at the spray head; (b) exhausting gas in the oil tank for resetting the positions of the oil cylinders; (c) supplying gas into the oil tank, thereby pressurizing the hydraulic oil; (d) allowing the transmission mechanism to move the spray head along a horizontal displacement plane for corresponding the sensor to one of the oil cylinders; (e) allowing the oil tank to pressurize the oil cylinder, thereby adjusting the construction platform; (f) sensing a vertical distance between the spray head and the oil cylinder by the sensor; (g) judging whether the vertical distance reach a target distance; (h) allowing the oil tank to stop pressurizing the oil cylinder; (i) judging whether the oil cylinders are all adjusted; and (j) stopping supplying gas into the oil tank. If the result of the judgment of the step (g) is True, the step (h)

is performed after the step (g), and if the result of the judgment of the step (g) is False, the step (f) and the step (g) are re-performed after the step (g). If the result of the judgment of the step (i) is True, the step (j) is performed after the step (i), and if the result of the judgment of the step (i) is False, the step (d), the step (e), the step (f), the step (g), the step (h) and the step (i) are re-performed after the step (i).

The above contents of the present invention will become more readily apparent to those ordinarily skilled in the art after reviewing the following detailed description and accompanying drawings, in which:

DETAILED DESCRIPTION OF THE PREFERRED EMBODIMENT

The present invention will now be described more specifically with reference to the following embodiments. It is to be noted that the following descriptions of preferred embodiments of this invention are presented herein for purpose of illustration and description only. It is not intended to be exhaustive or to be limited to the precise form disclosed.

Figure 1:
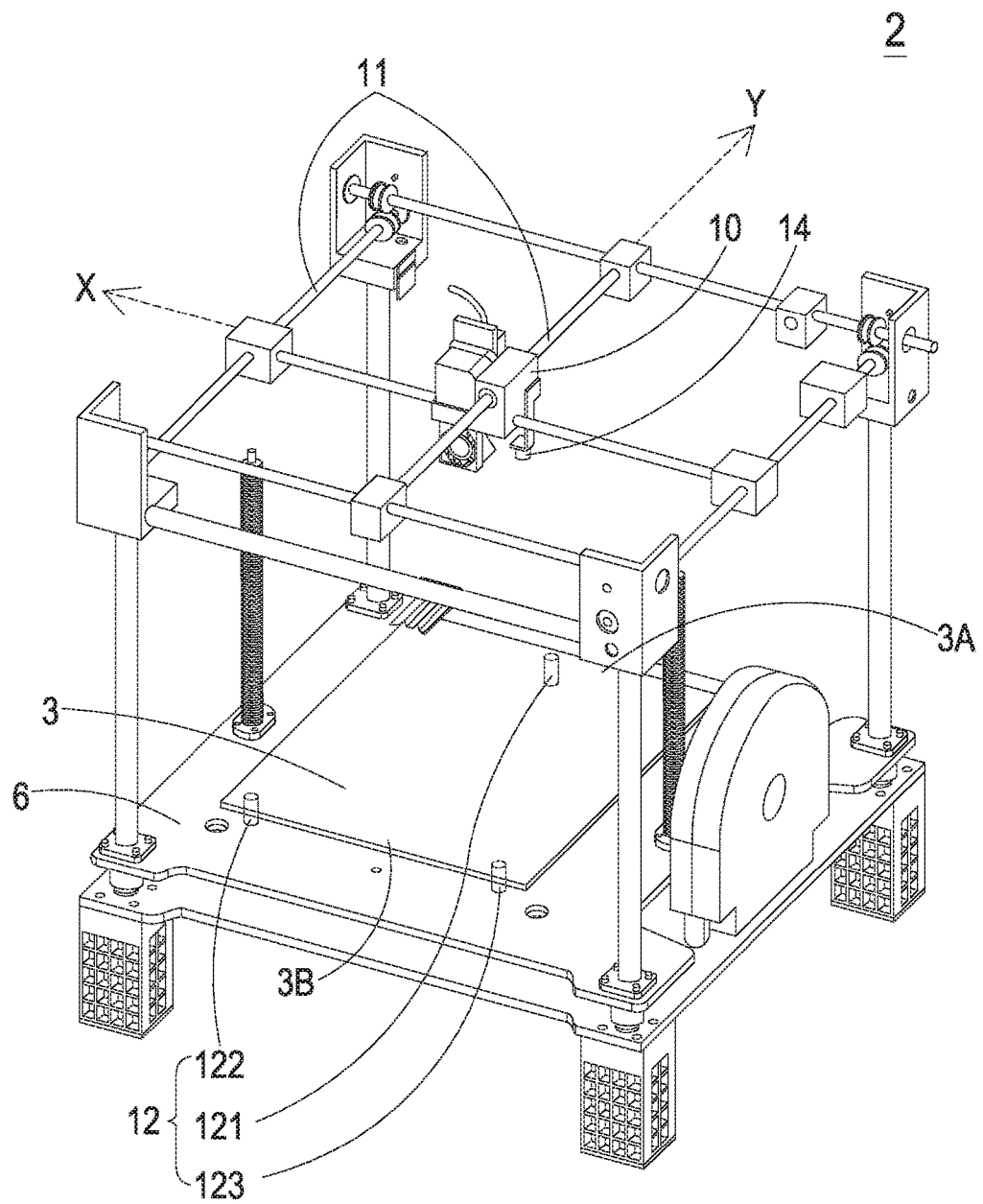
FIG. 1 schematically illustrates the structure of an adjustment device according to an embodiment of the present invention.
Figure 2:
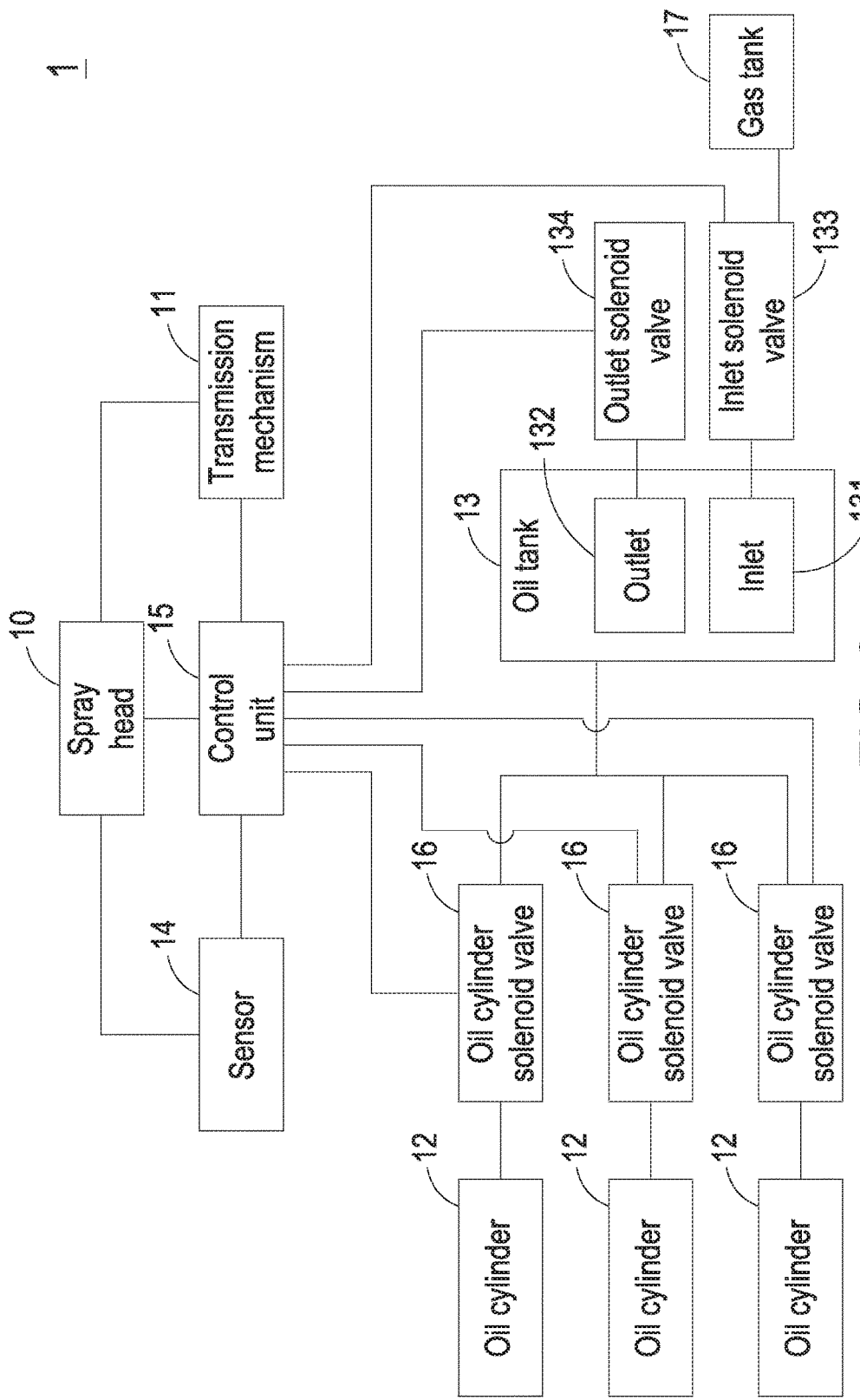
FIG. 2 schematically illustrates the configuration of an adjustment device according to an embodiment of the present invention.
Figure 3:
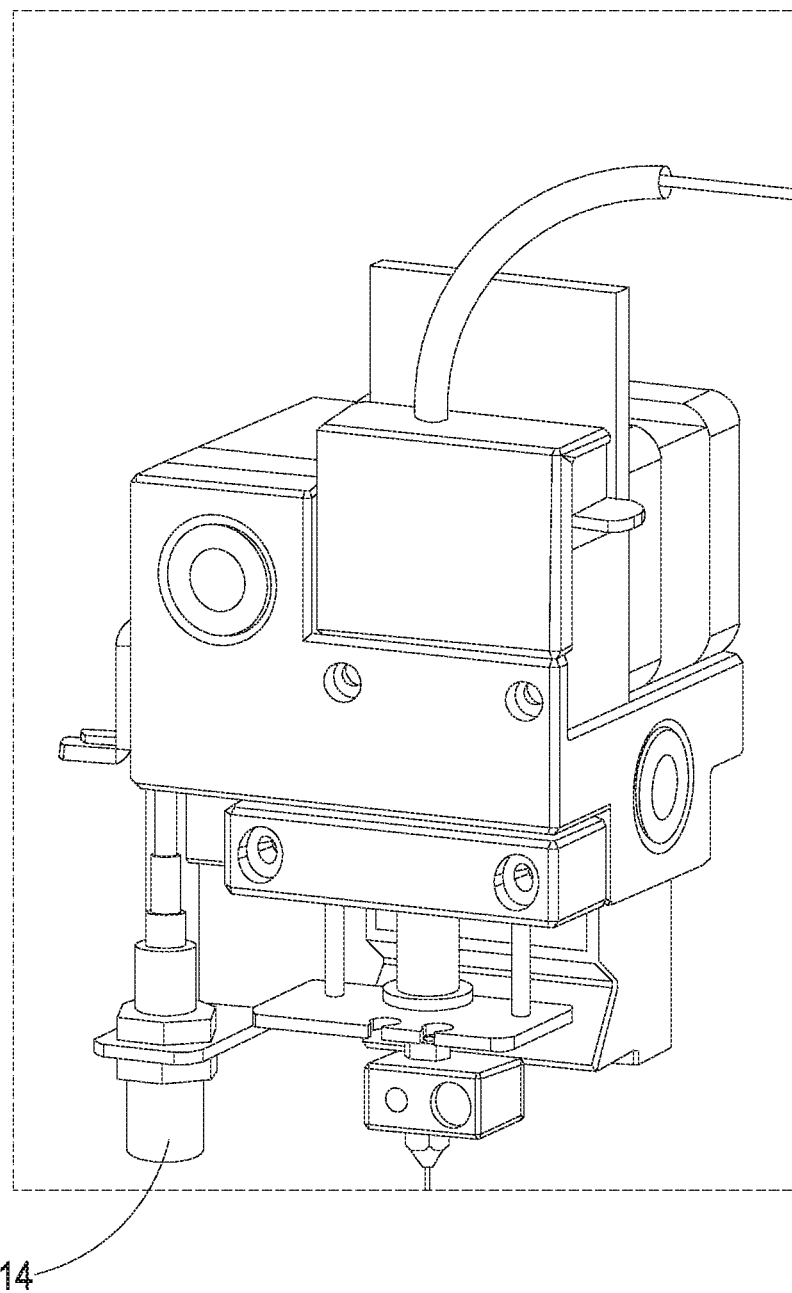
FIG. 3 schematically illustrates the structure of the spray head and the sensor of an adjustment device according to an embodiment of the present invention.
Figure 4:
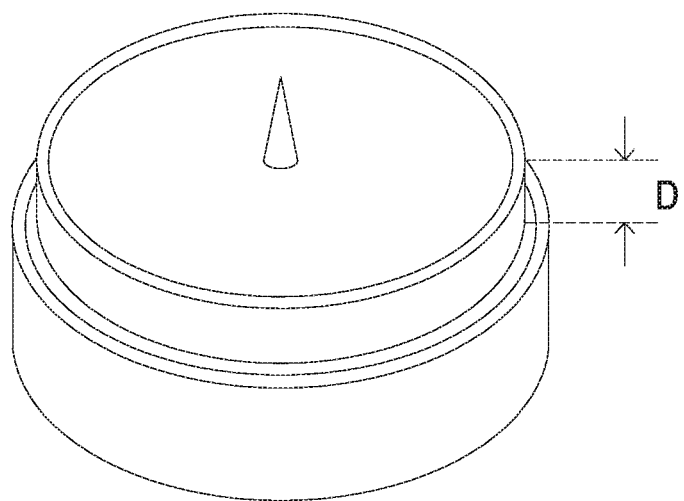
FIG. 4 schematically illustrates the structure of the oil cylinder of an adjustment device according to an embodiment of the present invention.

Please refer to FIG. 1, FIG. 2, FIG. 3 and FIG. 4. FIG. 1 schematically illustrates the structure of an adjustment device according to an embodiment of the present invention. FIG. 2 schematically illustrates the configuration of an adjustment device according to an embodiment of the present invention. FIG. 3 schematically illustrates the structure of the spray head and the sensor of an adjustment device according to an embodiment of the present invention. FIG. 4 schematically illustrates the structure of the oil cylinder of an adjustment device according to an embodiment of the present invention. As shown in FIG. 1, FIG. 2, FIG. 3 and FIG. 4, the adjustment device 1 of the present invention is adapted to a construction platform 3 of a three dimensional printer 2. The adjustment device 1 comprises a spray head 10, a transmission mechanism 11, a plurality of oil cylinders 12, an oil tank 13 and a sensor 14. The spray head 10 is disposed opposite to the construction platform 3, and is configured to spray materials and to model on the construction platform 3. The transmission mechanism 11 is connected with the spray head 10 for driving the spray head 10 to move at a horizontal displacement plane, which is a plane constituted by the X-axis and the Y-axis as shown in FIG. 1. Furthermore, the spray head 10 is driven through threaded rods, leather belts or steel ropes, but not limited thereto.

The oil cylinders 12 are disposed at the construction platform 3 for adjusting the construction platform 3 to be parallel to the horizontal displacement plane. Hydraulic oil is stored in the oil tank 13, and each oil cylinder 12 is connected with the oil tank 13 through an oil pipe, which means the number of the oil pipes is equal to the number of the oil cylinder 12, thereby pressurizing the oil cylinders 12 when the hydraulic oil in the oil tank 13 is pressurized. The sensor 14 is disposed at the spray head 10 for sensing a plurality of vertical distances between the spray head 10 and the oil cylinders 12 during the movement of the spray head driven by the transmission mechanism 12 at the horizontal displacement plane.

In some embodiments, the adjustment device 1 further comprises a control unit 15 and a plurality of oil cylinder solenoid valves 16. The control unit 15 is for example but not limited to a control circuit board, and the control unit 15 is connected to the transmission mechanism 11 and the sensor 14. The oil cylinder solenoid valves 16 are connected with the control unit 15, and each oil cylinder solenoid valve 16 is disposed corresponding to each oil pipe. Therefore, the control unit 15 can control transmission mechanism 11 to drive the spray head 10 to move to the position corresponding to the oil cylinders 12, such that the vertical distances between the spray head 10 and the oil cylinders 12 are sensed by the sensor 14, and are transmitted to the control unit 15. The control unit 15 can judge whether the vertical distances reaches a required target distance, control the oil cylinder solenoid valves 16 to be opened and closed, thereby controlling the oil tank 13 to pressurize the oil cylinders 12, or to stop pressurizing the oil cylinders 12.

In brief, by disposing the oil cylinders of simple structures and smaller volumes to adjust the construction platform of the three dimensional printer, the adjustment process and mechanism are simplified, and the space occupied by the adjustment device is reduced. In addition, through opening and closing the solenoid valves, the oil tank is controlled to pressurize the oil cylinders. The control circuit is easier, and the cost is lower. Furthermore, when the solenoid valves are closed, the oil cylinders can still maintain adjusted condition because of the incompressibility of the hydraulic oil, such that the stability of the construction platform is enhanced.

In some embodiments, the required pressure of the oil cylinders 12 is provided through the hydraulic oil in the oil tank 13. Since the hydraulic oil is incompressible, it is better to supply gas to the oil tank 13, and through pressurizing the gas, the pressure is transmitted to the hydraulic oil evenly. In some embodiments, the oil tank 13 further comprises an inlet 131 and an outlet 132. The inlet 131 and the outlet 132 are connected with the control unit 15 through an inlet solenoid valve 133 and an outlet solenoid valve 134 respectively for controlling the gas to enter and exit the oil tank 13. The gas can be supplied by the operator through using a manual pump, but not limited herein.

In some embodiments, the adjustment device 1 further comprises a gas tank 17. The gas tank 17 is connected with the inlet 131 of the oil tank 13 through a gas pipe for supplying gas into the oil tank 13 and pressurizing the hydraulic oil, but not limited thereto. The gas tank 17 can further comprise an inlet nozzle for allowing the gas to be pumped into the gas tank 17. The gas can be pumped into the gas tank 17 by using manual pumps, compressed gas cans, air compressors or compressed gas cylinders, but not limited herein. The compressed gas can be compressed air, nitrogen, carbon dioxide or inert gas, and the gas tank 17 can be connected with pressure gauges to monitor the inventory of the gas, but not limited thereto.

In some embodiments, the adjustment device 1 further comprises a lift platform 6. The lift platform 6 and the spray head 10 are disposed relatively at two different sides of the construction platform 3. Furthermore, the lift platform 6 is configured to lift the construction platform 3, such that a certain interval between the construction platform 3 and the spray head 10 can be kept, and the oil cylinders 12 are connected between the lift platform 6 and the construction platform 3.

In some embodiments, the oil cylinders 12 are disposed away to each other as far as possible at the edges of the construction platform 3, and the oil cylinders 12 are disposed are on at least two different lines. In some embodiments, the oil cylinders 12 comprise a first oil cylinder 121, a second oil cylinder 122 and a third oil cylinder 123. The first oil cylinder 121 is disposed at a first side 3A of the construction platform 3, the second oil cylinder 122 is disposed at an end of a second side 3B of the construction platform 3, and the second side 3B is opposite to the first side 3A. Furthermore, the third oil cylinder 123 is disposed at another end of the second side 3B of the construction platform 3. In some embodiments, the first oil cylinder 121 can be replaced with a fixed element which is immovable and unadjusted. That is to say, the construction platform 3 can be parallel to the horizontal displacement plane by only adjusting the second oil cylinder 122 and the third oil cylinder 123, but not limited herein.

In some embodiments, the strokes D of the oil cylinders 12 can be designed according to the offset value of the construction platform 3 caused due to some factors such as machine movements. For example, if the construction platform 3 has positive and negative maximum offset values ±d, then the stroke D of each oil cylinder 12 is better to be designed as greater than twice of the maximum offset value 2d, which means D>2d. If the oil cylinders 12 are corrected to the middle points of the strokes D before disposed, the offset value of the construction platform 3 can be compensated by the strokes of the oil cylinders 12 with the range 0 to D.

In some embodiments, each oil cylinder 12 further has a spring for resetting the position of the oil cylinder 12 when the oil cylinder 12 is not pressurized by the oil tank 13. For example, when the pushing-up force of the oil cylinder 12 is less than the elastic force of the spring, the oil cylinder 12 will be reset to the lowest position, which is the position where the stretch length is 0.

That is to say, since the strokes of the oil cylinders are constant values, and the oil cylinders can be reset to the lowest initial positions through the springs, the adjustment range of the oil cylinders is limited for preventing collision occurred while the construction platform is adjusted.

In some embodiments, each oil cylinder further comprises a piston. The piston is pushed up while the oil cylinder 12 is pressurized by the oil tank 13, and the area of the piston is designed according to the required pushing-up force of the piston of the oil cylinder 12. That is, the pressure in the oil cylinder 12 multiplied by the area of the piston is the pushing-up force of the piston. Furthermore, when the piston of the oil cylinder 12 is pushed up by the pressurization of the oil tank 13, the load of the piston is equal to the sum of the pressurizing-down force from the construction platform 3 to the piston plus the pressurizing-down force of the spring plus the weight of the piston itself plus the friction force of the piston. Therefore, the adequate areas of the pistons can be calculated by allowing the pushing-up force of the piston to be greater than the load of the piston, and reserving appropriate allowance, but not limited herein.

In some embodiments, by controlling the hydraulic oil flowing into the oil cylinder 12, and dividing the volume of the input hydraulic oil by the area of the piston, the forward value of the piston can be obtained. Therefore, by increasing the areas of the pistons, reducing the diameters of the oil pipes, reducing the calibers of the oil cylinder solenoid valves, or increasing the viscosity coefficient of the hydraulic oil, the velocity of the input oil can be decreased, such that there is much time for the adjustment device 1 to react, thereby achieving the advantages of enhancing the precision and accuracy of the adjustment. For example, if the diameter of the piston of the oil cylinder 12 is 30 mm, the required volume of the input oil is 70.7 mm$^3$ when the piston forwards 0.1 mm. If the diameter of the oil pipe is 2 mm, then the hydraulic oil in the oil pipe needs to be pushed forward for 22.5 mm. In another example, if the diameter of the piston of the oil cylinder 12 is 60 mm, the required volume of the input oil is 282.7 mm$^3$ when the piston forwards 0.1 mm. If the diameter of the oil pipe is 2 mm, then the hydraulic oil in the oil pipe needs to be pushed forward for 90 mm.

Consequently, through adjusting the areas of the pistons of the oil cylinders, the diameters of the oil pipes and the viscosity coefficient of the hydraulic oil, the velocity and precision of adjusting the oil cylinders are controlled, and the advantages of enhancing the precision and accuracy of the adjustment of the construction platform are achieved.

In some embodiments, hydraulic oil is stored in the lower half part of the oil tank 13, gas is stored in the upper half part of the oil tank. In some embodiments, the minimum stored amount of the hydraulic oil have to be larger than the required volume of the total strokes of the oil cylinders 12, which is equal to the product of the area of the piston of the oil cylinder 12, the stroke D and the number of the oil cylinders 12. The space of the upper half part of the oil tank 13 where the gas stored also have to be larger than the required volume of the total strokes of the oil cylinders 12. In some embodiments, an elastic film can be added between the hydraulic oil and the gas in the oil tank 13 to isolate the hydraulic oil and the gas for preventing the steam in the gas or other impurities from dissolving into the hydraulic oil, such that the using life of the hydraulic oil can be extended, and the leakage of the hydraulic oil while the storage tank 13 dumped is prevented.

Figure 5:
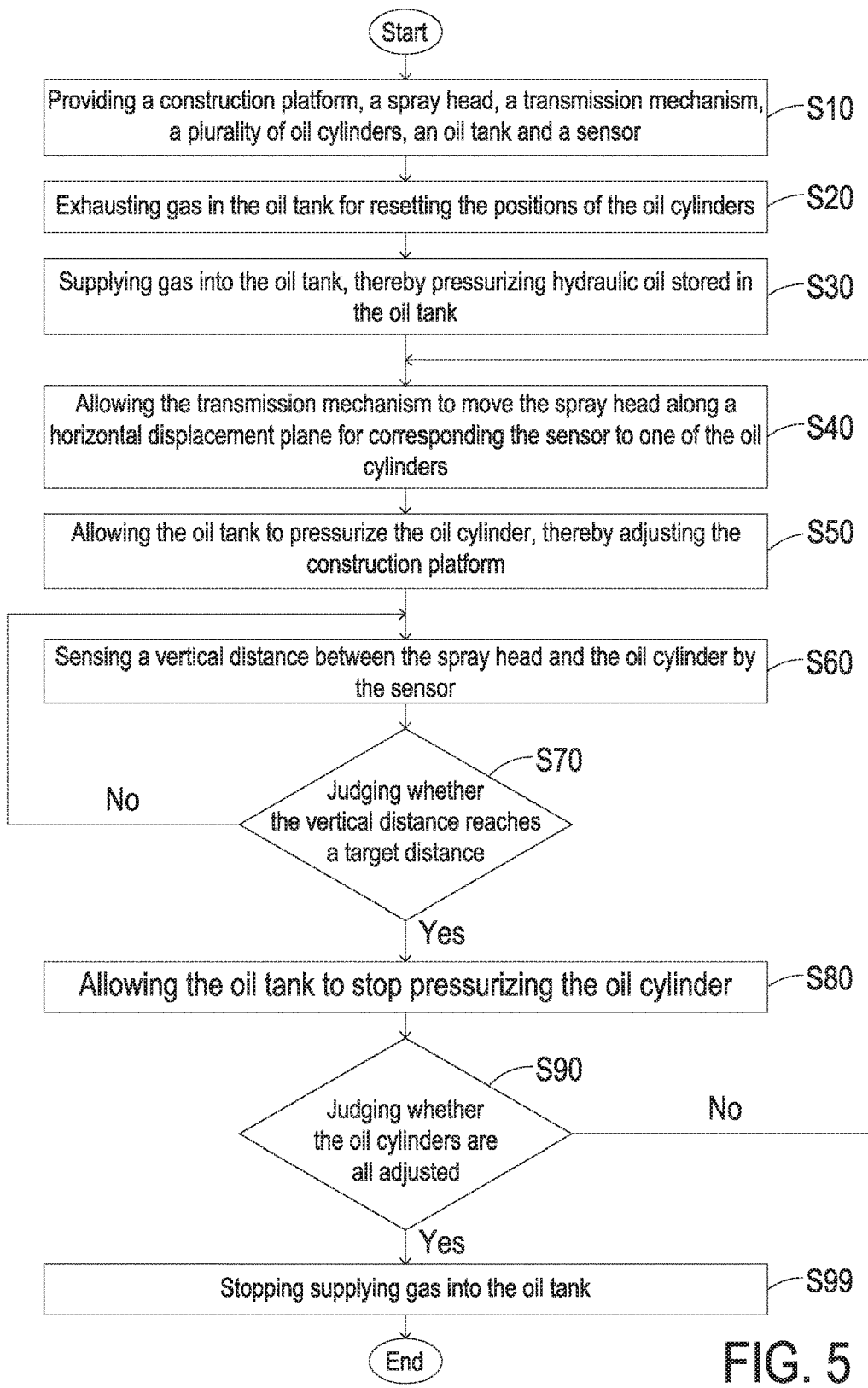
FIG. 5 schematically illustrates the flowchart of an adjusting method according to an embodiment of the present invention.

Please refer to FIG. 1, FIG. 2 and FIG. 5. FIG. 5 schematically illustrates the flowchart of an adjusting method according to an embodiment of the present invention. As shown in FIG. 1, FIG. 2 and FIG. 5, the adjusting method of an embodiment of the adjustment device 1 of the present invention comprises the following steps. Firstly, in a step S10, a construction platform 3, a spray head 10, a transmission mechanism 11, a plurality of oil cylinders 12, an oil tank 13 and a sensor 14 are provided. The spray head 10 is disposed opposite to the construction platform 3, the transmission mechanism 11 is connected to the spray head 10, the oil cylinders 12 are disposed at the construction platform 3, hydraulic oil is stored in the oil tank 13, each oil cylinder 12 is connected with the oil tank 13 through an oil pipe, and the sensor 14 is disposed at the spray head 10.

Then, in a step S20, the gas in the oil tank 13 is exhausted for resetting the positions of the oil cylinders 12, such as resetting through the springs, but not limited herein. Then, in a step S30, the gas is supplied into the oil tank 13, thereby pressurizing the hydraulic oil. Next, in a step S40, the transmission mechanism 11 is allowed to move the spray head 10 along a horizontal displacement plane for corresponding the sensor 14 to one of the oil cylinders 12. Then, in a step S50, the oil cylinder 12 is pressurized by the oil tank 13, thereby adjusting the construction platform 3. Then, in a step S60, the vertical distance between the spray head 10 and the oil cylinder 12 is sensed by the sensor 14. Next, in a step S70, judging whether the vertical distance reaches a target distance. For example, the judgement is implemented through the control unit 15 receiving the vertical distance from the sensor 14, and comparing the vertical distance to a target distance, but not limited thereto. In some embodiments, if the result of the judgment of the step S70 is False, the step S60 and the step S70 are re-performed after the step S70. In some embodiments, if the result of the judgment of the step S70 is True, the step S80 is performed after the step S70. In a step S80, the oil tank 13 is stopped pressurizing the oil cylinder 12.

Next, in a step S90, judging whether the oil cylinders are all adjusted, and the judgement is implemented by the control unit 15, but not limited herein. In some embodiments, if the result of the judgment of the step S90 is False, the step S40, the step S50, the step S60, the step S70, the step S80 and the step S90 are re-performed after the step S90. In some embodiments, if the result of the judgment of the step S90 is True, the step S99 is performed after the step S90. In a step S99, gas is stopped supplying into the oil tank, such that the operation of adjusting the construction platform 3 is finished.

In some embodiments, the adjusting method further comprises a plurality of oil cylinder solenoid valves 16, and each oil cylinder solenoid valve 16 is disposed at each oil pipe. In addition, the oil tank 13 further comprises an inlet 131 and an outlet 132, and an inlet solenoid valve 133 and an outlet solenoid valve 134 are disposed at the inlet 131 and the outlet 132 respectively. In the step S20, the inlet solenoid valve 133 is closed, and the outlet solenoid valve 134 and the oil cylinder solenoid valves 16 are opened. In the step S30, the outlet solenoid valve 134 and the oil cylinder solenoid valves 16 are closed, and the inlet solenoid valve 133 is opened. Furthermore, in the step S50, the oil cylinder solenoid valve 16 is opened. In the step S80, the oil cylinder solenoid valve 16 is closed. In the step S99, the inlet solenoid valve 133 is closed.

From the above description, the present invention provides an adjustment device and an adjusting method thereof. By disposing the oil cylinders of simple structures and smaller volumes to adjust the construction platform of the three dimensional printer, the adjustment process and mechanism are simplified, and the space occupied by the adjustment device is reduced. Furthermore, through opening and closing the solenoid valves, the oil tank is controlled to pressurize the oil cylinders. The control circuit is easier, and the cost is lower. In addition, when the solenoid valves are closed, the oil cylinders can still maintain adjusted condition because of the incompressibility of the hydraulic oil, such that the stability of the construction platform is enhanced. Meanwhile, since the strokes of the oil cylinders are constant values, and the oil cylinders can be reset to the lowest initial positions through the springs, the adjustment range of the oil cylinders is limited for preventing collision occurred while the construction platform is adjusted. Moreover, through adjusting the areas of the pistons of the oil cylinders, the diameters of the oil pipes and the viscosity coefficient of the hydraulic oil, the velocity and precision of adjusting the oil cylinders are controlled, and the advantages of enhancing the precision and accuracy of the adjustment of the construction platform are achieved.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:
1. A three dimensional printer comprising:
   an adjustment device of a construction platform of the three dimensional printer;
   a spray head disposed opposite to the construction platform; a transmission mechanism connected to the spray head for driving the spray head to move at a horizontal displacement plane;
   a plurality of oil cylinders disposed at the construction platform for adjusting the construction platform to be parallel to the horizontal displacement plane;
   an oil tank, wherein hydraulic oil is stored in the oil tank, and each oil cylinder is connected with the oil tank through an oil pipe; and a sensor disposed at the spray head for sensing a plurality of vertical distances between the spray head and the oil cylinders during the movement of the spray head at the horizontal displacement plane;
   a control unit connected with the transmission mechanism and the sensor; and a plurality of oil cylinder solenoid valves connected with the control unit, wherein each oil cylinder solenoid valve is disposed corresponding to each oil pipe, wherein the oil tank further comprises an inlet and an outlet connected with the control unit through an inlet solenoid valve and an outlet solenoid valve respectively for controlling a gas to enter and exit the oil tank.

2. The three dimensional printer according to claim 1 further comprising a gas tank connected with the inlet through a gas pipe for supplying gas into the oil tank and pressurizing the hydraulic oil.

3. The three dimensional printer according to claim 1 further comprising a lift platform, wherein the oil cylinders are connected between the lift platform and the construction platform.

4. The three dimensional printer according to claim 1, wherein the oil cylinders comprise:
   a first oil cylinder disposed at a first side of the construction platform;
   a second oil cylinder disposed at an end of a second side of the construction platform, wherein the second side is opposite to the first side; and a third oil cylinder disposed at another end of the second side of the construction platform.

5. The three dimensional printer according to claim 1, wherein the construction platform has a maximum offset value, each oil cylinder has a stroke, and the stroke is greater than twice of the maximum offset value.

6. The three dimensional printer according to claim 1, wherein each oil cylinder has a spring for resetting the position of the oil cylinder when the oil cylinder is not pressurized by the oil tank.

\* \* \* \* \*